United States Patent
Wu et al.

(10) Patent No.: US 7,355,939 B2
(45) Date of Patent: Apr. 8, 2008

(54) SYSTEM AND METHOD FOR SWITCHING CONTROL MODES OF SPINDLE MOTOR

(75) Inventors: Chang-long Wu, Yi-Lan (TW); Chao-long Tsai, Hsin-chu (TW)

(73) Assignee: MEDIATEK Inc., Hsin-Chu (TW)

( * ) Notice: Subject to any disclaimer, the term of this patent is extended or adjusted under 35 U.S.C. 154(b) by 0 days.

(21) Appl. No.: 11/464,099

(22) Filed: Aug. 11, 2006

(65) Prior Publication Data
US 2008/0037961 A1 Feb. 14, 2008

(51) Int. Cl.
*G11B 5/09* (2006.01)
(52) U.S. Cl. .................. 369/47.41; 369/50; 369/47.48; 369/47.4; 369/30
(58) Field of Classification Search ................ 388/832; 369/47.41, 50; 360/71, 72.1, 73.03
See application file for complete search history.

(56) References Cited

U.S. PATENT DOCUMENTS

| | | | | |
|---|---|---|---|---|
| 4,539,666 A * | 9/1985 | Wachi | .................. | 369/47.46 |
| 4,984,227 A * | 1/1991 | Yoshimaru | ................ | 369/47.41 |
| 5,136,560 A * | 8/1992 | Hangai et al. | ............ | 369/30.17 |
| 5,315,571 A * | 5/1994 | Maeda et al. | ............. | 369/47.41 |
| 5,521,895 A * | 5/1996 | Miura et al. | ................ | 369/47.4 |
| 5,751,676 A * | 5/1998 | Kusano et al. | ........... | 369/47.41 |
| 5,877,907 A * | 3/1999 | Tanishima et al. | ............ | 360/30 |
| 5,901,121 A * | 5/1999 | Yamashita et al. | ........ | 369/44.28 |
| 5,986,988 A * | 11/1999 | Kusano et al. | ........... | 369/47.41 |
| 6,055,219 A * | 4/2000 | Ho et al. | .................. | 369/53.29 |
| 6,069,858 A * | 5/2000 | Endo et al. | ................. | 720/627 |
| 6,137,757 A * | 10/2000 | Kinoshita | ................ | 369/47.41 |
| 6,870,802 B1 * | 3/2005 | Kimura et al. | ........... | 369/47.41 |
| 2002/0071363 A1 * | 6/2002 | Koudo et al. | ............. | 369/47.48 |
| 2004/0120235 A1 * | 6/2004 | Koide | ..................... | 369/47.53 |

* cited by examiner

*Primary Examiner*—Lincoln Donovan
*Assistant Examiner*—Antony M. Paul

(57) ABSTRACT

A system and method of switching the control modes of spindle motor are described. The switch system comprises a first control module, a second control module and a switch controller. The first control module electrically coupled to the spindle motor and the OPU controls the spindle motor to be operated in a present mode. The second control module is electrically coupled to the spindle motor to control the spindle motor to be operated in the transition mode between the present mode and the target mode. The switch controller electrically coupled to the first control module, the second control module and the spindle motor receives a present feedback signal associated with the rotation of spindle motor to generate a first switch signal. Furthermore, the switch controller receives a target indicative signal associated with the information on the optical storage medium to generate a second switch signal. The switch controller then switches the control mode of the spindle motor from the present mode to the transition mode in response to the first switch signal, and the switch controller switches the control mode of the spindle motor from the transition mode to the target mode in response to the second switch signal.

36 Claims, 7 Drawing Sheets

SYSTEM AND METHOD FOR SWITCHING CONTROL MODES OF SPINDLE MOTOR

FIELD OF THE INVENTION

The present invention relates to a switching system and method, and more particularly to a system and method of switching the spindle motor control modes applicable to an optical storage drive.

BACKGROUND OF THE INVENTION

Conventionally, the control modes of spindle motors in an optical storage drive include constant angular velocity (CAV) control mode and constant linear velocity (CLV) control mode. Generally, it is necessary to switch the spindle motor control modes between CAV control mode and CLV control mode when a seek operation is performed in the optical storage drive. It is very important that how to switch rapidly and accurately the control modes therebetween in order to improve the operation efficiency and stability of the optical storage drive simultaneously.

Taking an example of CAV control mode of the seek operation, FIG. 1 is one graph of the relationship between rotation speed and radial position of the optical disk in conventional CLV and CAV control modes. The dashed line represents the rotation speed profile from inner to outer radial position under CLV control mode. If the linear velocity of the optical disk is constant under CLV control mode, the rotation speed of the optical disk needs to be decreased progressively from inner to outer radial position.

As shown in FIG. 1, the solid curvy line from positions A to B represents the rotation speed profile from outer to inner circle of the optical disk under CAV control mode. When an optical pick-up (OPU) is moving from a starting position A to a target position B on the optical disk, it is required to calculate the rotation speed of target position B first. During the OPU movement, meanwhile, CAV control mode is employed to speed up or slow down the spindle motor of the optical storage drive. In FIG. 1, it is a speed-up case from position A and then transitionally tends to position B. Theoretically, when the OPU reaches the target position and the calculated rotation speed responsive to the target position is met, CLV control mode is then performed. However, in fact, the actual position switching to the target position is hard to decide exactly, and/or the difference between the actual rotation speed and the calculated rotation speed of the target position may be not close enough. Therefore, the timing switching to CLV control mode (i.e., from position C on solid line AC to position B on the dashed line) is too early and it is necessary to accelerate the rotation speed in position C via CLV control mode due to rotation speed difference between actual position C and target position B. Therefore, there is a great need of power consumption on acceleration of the rotation speed and more seeking time of the OPU is required.

Further, in one prior art of FIG. 1, switching to CLV control mode is performed according to whether the target position in the optical disk is sought or not. An estimated rotation speed at the target position will be calculated and the rotation speed is adjusted to achieve the estimated rotation speed by CAV control mode. However, as shown by solid line AC in FIG. 1, the estimated rotation speed may not meet the target rotation speed even though the OPU reaches the target position. In other words, after switching position A to position C, CAV control mode is instantly switched to CLV control mode but the CLV control status of the spindle motor is unstable because the rotation speed difference between position C and target position B is still large.

In another prior art of FIG. 2, the control modes of the spindle motor are switched therebetween on the basis of whether the rotation speed is high enough when a recording process is performed on the optical disk from inner to outer track or vice versa. However, when seeking operation is implemented, the position switch control or the rotation speed of the optical disk fails to meet criterion because the components assembly faults, limited position criterion or incorrect rotation speed threshold of the optical storage drive is employed. As shown in FIG. 2, estimated position D is far away from target position B, and offsets from the speed criterion, i.e. delta V, so that the control mode fails to be switched into the delta V. Furthermore, after switching position A to position D, the CLV control mode of the spindle motor is severely unstable because estimated position D considerably offsets from target position B.

Consequently, there is a need to develop a switching system and method to solve the above-mentioned problems.

SUMMARY OF THE INVENTION

The first objective of the present invention is to provide a system and method of switching the control modes of spindle motor by analyzing whether the rotation speed of spindle motor is constant or stably reaches to a predetermined rotation speed threshold interval, and whether the information on the optical storage medium are correctly decoded.

The second objective of the present invention is to provide a system and method of switching the control modes to adjust dynamically the control voltage of spindle motor during the transition mode to avoid control voltage jumps at the mode-switch point.

The third objective of the present invention is to provide a system and method of switching the control modes to switch easily and rapidly the control modes therebetween on the basis of a preferred control criterion.

According to the above objectives, the present invention sets forth a system and method of switching the control modes of the spindle motor. The switch system comprises a first control module, a second control module, and a switch controller.

The first control module is electrically coupled to the spindle motor via a power driver and electrically coupled to the OPU via both a decoder and a phase-locked loop (PLL) circuit. The first control module controls the spindle motor to be operated in either a present mode or a target mode. The second control module is electrically coupled to the spindle motor via the power driver to control the spindle motor to be operated in the transition mode between the present mode and the target mode. The switch controller, which is electrically coupled to the first control module, the second control module, the spindle motor, the frequency generator (FG) and the look-up table (LUT), receives a present feedback signal associated with a rotation speed of spindle motor in order to generate a first switch signal according to the rotation speed. It should be noted that the transition mode represents the intermediate stage mode between the present mode and the target mode which are both closed loop control modes.

Furthermore, the switch controller receives a target indicative signal associated with the information on the optical storage medium to generate a second switch signal. The target indicative signal serves as the indication of whether the decoded or identified information from the optical storage medium is correct. The switch controller switches the control mode of the spindle motor between the present mode and the transition mode in response to the first switch signal based on the rotation speed, and the switch controller switches the control mode of the spindle motor from the transition mode to the target mode in response to the second switch signal based on the target indicative signal.

In one preferred embodiment of the present invention, the switch system further comprises a frequency generator (FG) electrically coupled to the spindle motor, the first control module and the switch controller to generate output pulses of the spindle motor. More importantly, the switch system further comprises a decoder electrically coupled to the OPU, the first control module and the switch controller to decode the information on the optical storage medium.

In addition, the switch system also comprises a look-up table (LUT) representing the relationship between the radial position of the optical storage medium and the rotation speed of the spindle motor. The control voltage of the spindle motor is represented as a function of the rotation speed. Moreover, the switch system comprises a phase-locked loop (PLL) circuit electrically coupled to the OPU, the first control module and the switch controller for identifying the information on the optical storage medium and restoring the timing of the phase-locked information. Preferably, the power driver receives control voltage from the first control module or second control module to drive the spindle motor.

In operation, the control method of switching the control modes is described in detail as the following steps. The spindle motor is controlled to be operated in a present mode while recording the information on or read the information from a first radial position of the optical storage medium. The rotation mode of the spindle motor is switched from the present mode to a transition mode when generating a first switch signal according to a present feedback signal associated with the rotation information of the spindle motor. In one embodiment, output pulses of the spindle motor are generated to detect whether the spindle motor is rotated stably at a constant rotation speed according to the output pulses while switching the control mode from the present mode to the transition mode. Afterwards, the switch controller determines whether the rotation speed of the spindle motor is stable. If no, the spindle motor is controlled to be operated in a present mode. Otherwise, if yes, the spindle motor is controlled to be operated in the transition mode between the present mode and the target mode while the rotation speed of the spindle motor is stable. That is, while recording the information on a second radial position of the optical storage medium, the OPU operates in the transition mode corresponding to the second radial position. In one embodiment, a look-up table (LUT) is generated. A control voltage of the spindle motor in the LUT is represented as a function of the rotation speed to adjust the control voltage of the spindle motor during the transition mode by referring to the relationship between the radial position and the control voltage in the LUT until the information is correctly decoded. Then switch controller determines whether the spindle motor is rotated stably and accurately enough to the rotation speed of the target mode by referring to the relationship between the radial position and the rotation speed in the LUT while switching the control mode from the transition mode to the target mode. Then, the rotation mode of the spindle motor is switched from the transition mode to the target mode when generating a second switch signal according to a target indicative signal associated with information on the optical storage medium. In one embodiment, the switch controller determines whether the data in the information is correctly decoded or the information on the optical storage medium is identified while switching the control mode from the transition mode to the target mode. Finally, if yes, the spindle motor is controlled to be operated in a target mode while decoding the information en or reading the information from a radial position of the optical storage medium is correct. Otherwise, the spindle motor is controlled to be operated in the transition mode between present mode and the target mode.

The advantages of the present invention mainly include: (a) analyzing whether the rotation speed is constant or stably reaches to a predetermined rotation speed threshold interval, and whether the information are correctly decoded when the control mode is to be changed from the transition mode to a target mode; (b) adjusting the control voltage dynamically during the transition mode to avoid control voltage jumps at the mode-switch point; and (c) changing the control mode easily and rapidly by employing a preferred control criterion.

DETAILED DESCRIPTION OF THE PREFERRED EMBODIMENTS

The present invention is directed to a system and method of switching the control modes of the spindle motor by analyzing whether the rotation speed of spindle motor is constant or stably reaches to a predetermined rotation speed threshold interval when the control mode is to be changed from a present mode to a transition mode and the information on the optical storage medium are correctly decoded when the control mode is to be changed from the transition mode to a target mode. Furthermore, the system switches the control modes to adjust dynamically the control voltage of spindle motor during the transition mode to avoid control voltage jumps at the mode-switch point so that the switch controller smoothly switches the transition mode to the target mode. Additionally, the system switches the control modes to change easily and rapidly the control mode according to a preferred control criterion.

Figure 1:
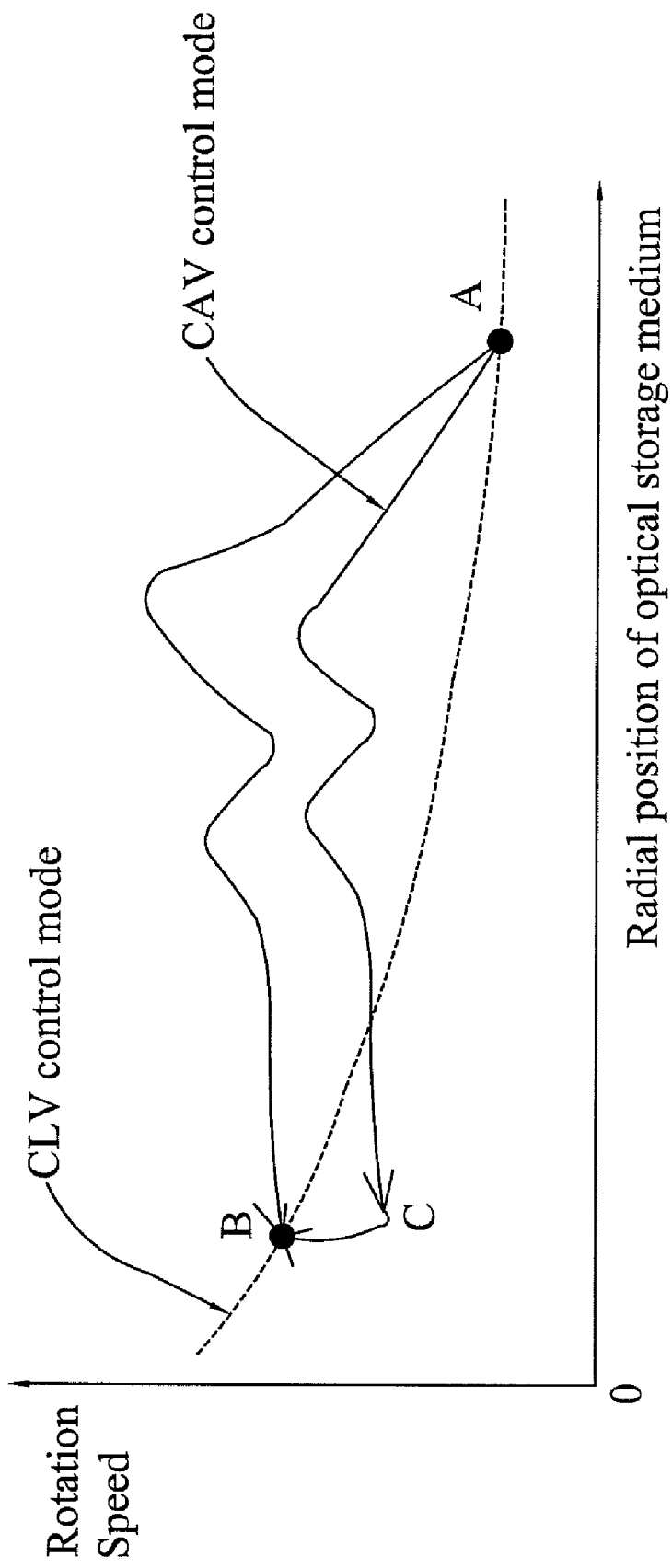
FIG. 1 is one graph of the relationship between rotation speed and radial position of the optical disk in conventional CLV and CAV control modes.
Figure 2:
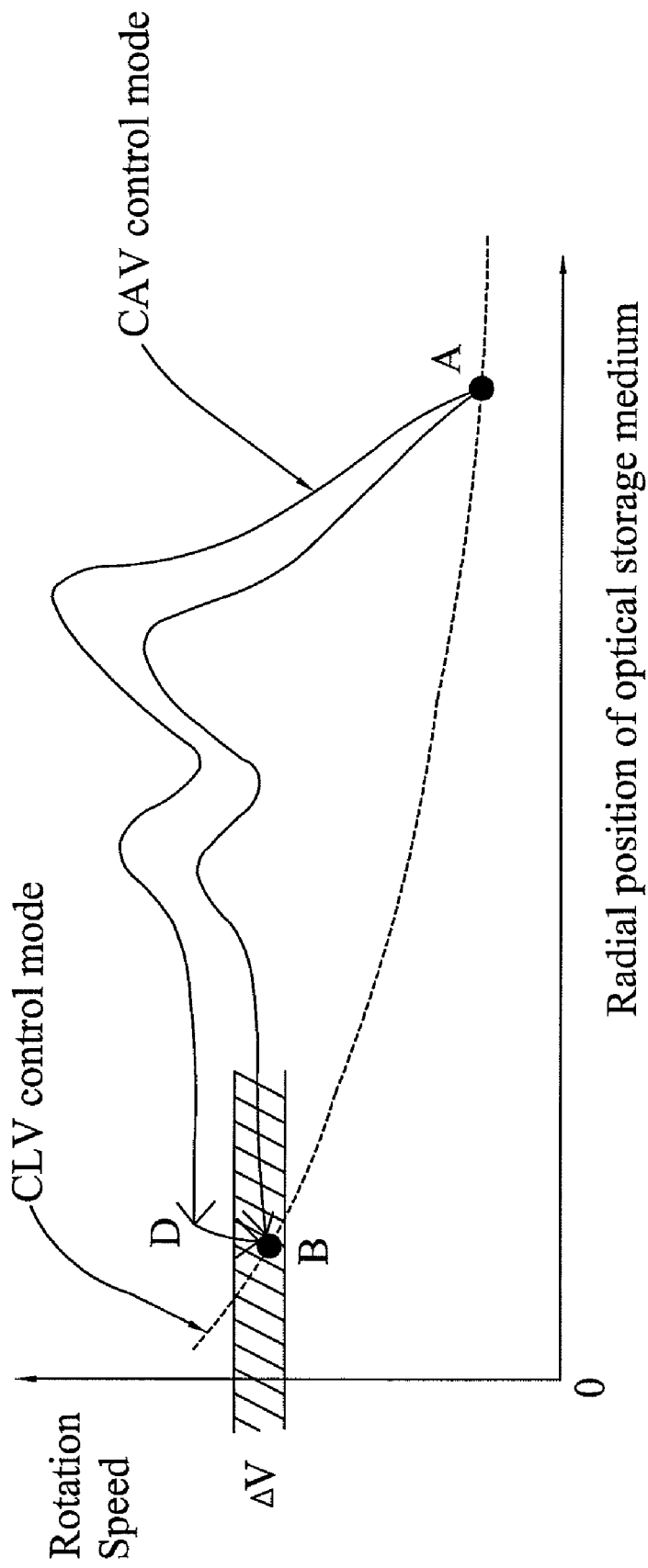
FIG. 2 is another graph of the relationship between rotation speed and radial position of the optical disk in conventional CLV and CAV control modes.
Figure 3:
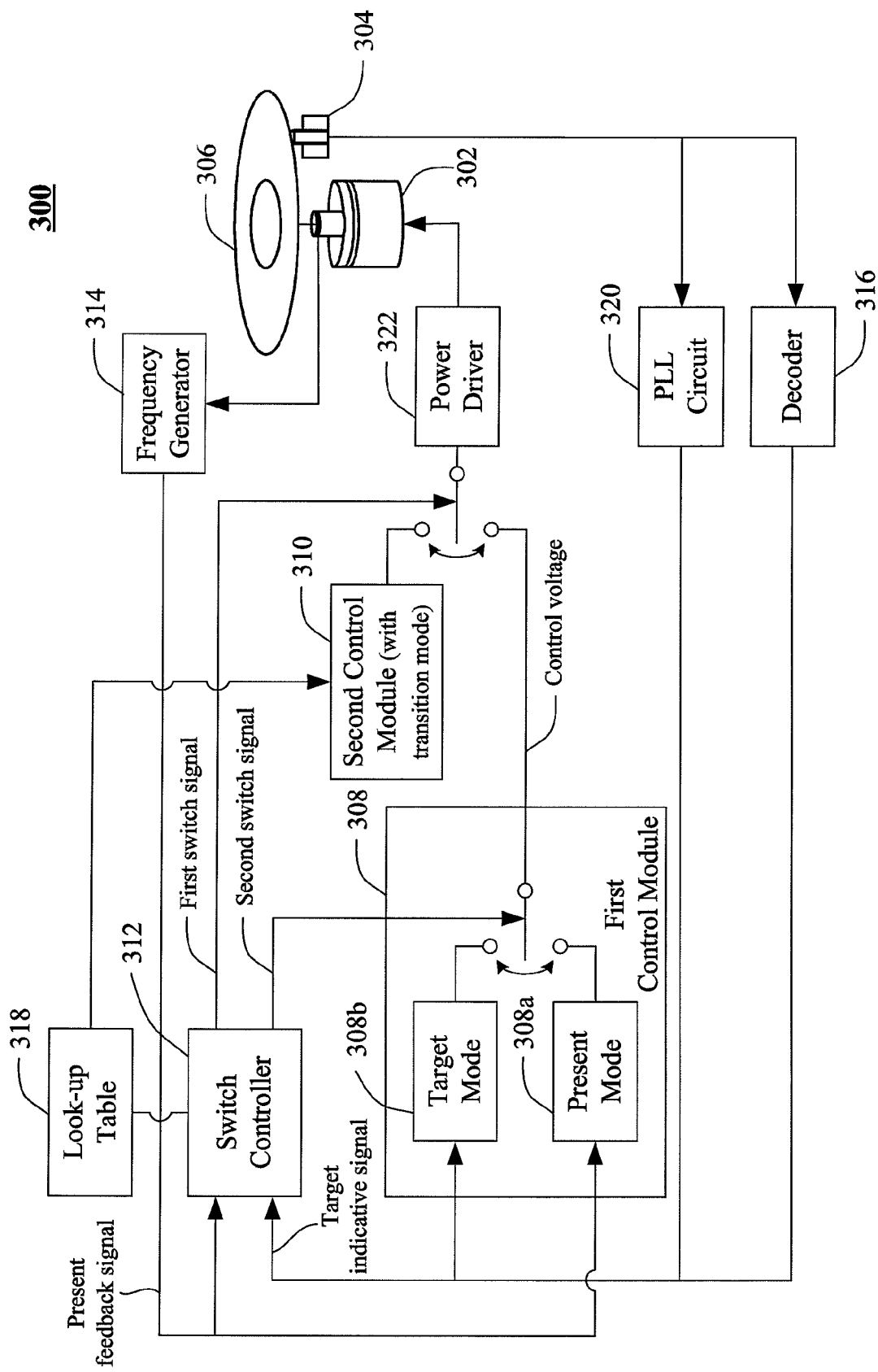
FIG. 3 is a block diagram of switch system according to one preferred embodiment of the present invention.

FIG. 3 is a block diagram of switching system according to one preferred embodiment of the present invention. The system 300 switches a plurality of control modes of a spindle motor 302 therebetween when an optical pick-up (OPU) 304 records or reproduces information on an optical storage medium 306. The switch system 300 comprises a first control module 308, a second control module 310 and a switch controller 312.

The first control module 308 is electrically coupled to the spindle motor 302 via a power driver 322 and electrically coupled to the OPU 304 via both a decoder 316 and a phase-locked loop (PLL) circuit 320. The first control module 308 controls the spindle motor 302 to be operated in either a present mode 308a or a target mode 308b. The second control module 310 is electrically coupled to the spindle motor 302 via the power driver 322 to control the spindle motor 302 to be operated in the transition mode 310 between the present mode 308a and the target mode 308b. The switch controller 312 is electrically coupled to the first control module 308, the second control module 310, a frequency generator (FG) 314 and a look-up table (LUT) 318.

The switch controller 312 receives a present feedback signal associated with a rotation speed of spindle motor 302 in order to generate a first switch signal according to the rotation speed. Furthermore, the switch controller 312 receives a target indicative signal associated with the information on the optical storage medium 306 to generate a second switch signal. The target indicative signal serves as the indication of whether the decoded or identified information from the optical storage medium 306 is correct. Specifically, the switch controller 312 switches the control mode of the spindle motor 302 between the present mode 308a and the transition mode 310 in response to the first switch signal based on the rotation speed. The switch controller 312 switches the control mode of the spindle motor 302 from the transition mode 310 to the target mode 308b in response to the second switch signal based on the target indicative signal.

In one preferred embodiment of the present invention, the frequency generator 314 in the switch system 300 is electrically coupled to the spindle motor 302, the first control module 308 and the switch controller 312 to generate the present feedback signal which is related to the output pulses of the spindle motor 302. More importantly, the decoder 316 in the switch system 300 is electrically coupled to the OPU 304, the first control module 308 and the switch controller 312 to decode information on the optical storage medium 306.

Specifically, the look-up table 318 in the switch system 300 serves to store data representing the relationship between the radial position of the optical storage medium 306 and the rotation speed of the spindle motor 302. The control voltage of the spindle motor 302 is represented as a function associated with the rotation speed of the spindle motor 302. Moreover, the phase-locked loop (PLL) circuit 320 in the switch system 300 is electrically coupled to the OPU 304, the first control module 308 and the switch controller 312 and identifies the information on the optical storage medium 306 while the OPU 304 is performing recording or reproducing step. Person skilled in the art should be noted that the optical storage medium 306 has a wobble structure thereon. Further, the OPU 304 is capable of detecting the wobble structure, generates a wobble signal, and thereby outputs the information associated with the wobble signal. The power driver 322 receives the control voltage from the first control module 308 or second control module 310 to drive the spindle motor 302.

In one preferred embodiment of the present invention, the transition mode 310 controlled by the first control module 308 is an open loop. The present mode 308a controlled by the second control module 310 is a constant angular velocity (CAV) mode in a closed loop control. The target mode 308b controlled by the second control module 310 is a constant linear velocity (CLV) mode in a closed loop control. The transition mode is used to represent the intermediate stage mode between the present mode and the target mode which are both closed loop control modes. The transition mode is determined by the look-up table 318 and thus the transition mode 310 can be the open loop control. The present mode 308a and the target mode 308b are determined by the present feedback signal or the target indicative signal. Therefore, the switch system can change the control modes of the spindle motor easily and rapidly.

Figure 4A:
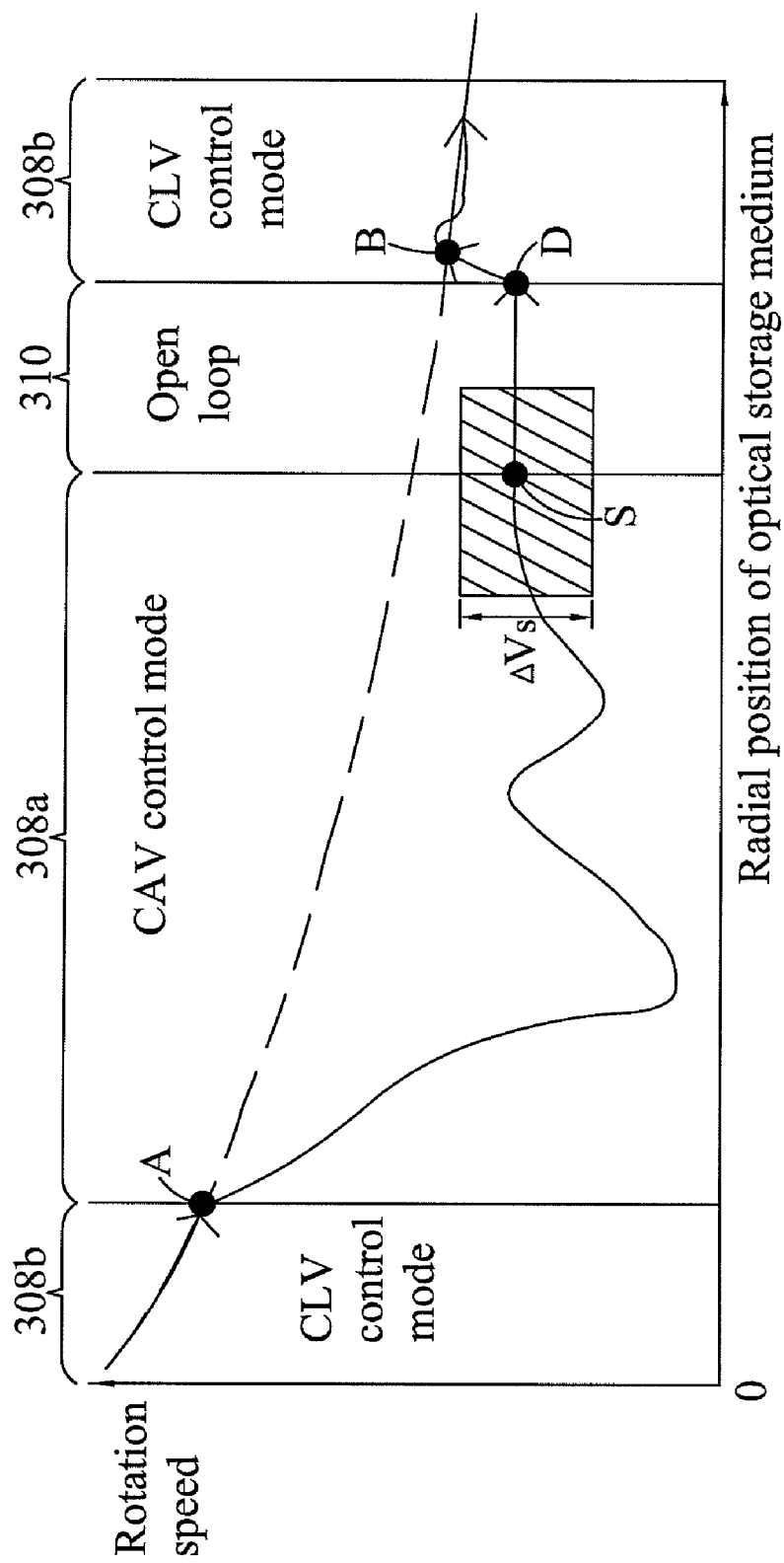
FIG. 4A is a graph of the relationship between the rotation speed and radial position of the optical storage medium in FIG. 3 according to first preferred embodiment of the present invention.

Please refer to FIG. 3, again, and FIG. 4A. FIG. 4A is a graph of the relationship between the rotation speed and radial position of the optical storage medium according to first preferred embodiment of the present invention. In FIG. 4A, the control modes of the spindle motor 302 comprises CAV control mode, open loop mode and CLV control mode. First, the control mode is switched from CLV control mode to CAV control mode in order to start to move the OPU 304 from position A to target position B. During the CAV control mode, the present feedback signal indicates that the switch controller 312 detects whether the spindle motor 302 stably rotates at a constant rotation speed threshold interval according to the output pulses of the frequency generator (FG) 314 while switching the control mode from the CAV control mode to the open loop mode. When the rotation speed falls into the delta $V_S$, the control mode is switched from CAV control mode at position S to open loop mode at position D, where delta $V_S$ is predetermined rotation speed threshold interval at the intermediate position S. Then, the open loop mode at position D is directly switched to CLV control mode at position B once again. Conversely, when the rotation speed is out of the delta $V_S$, the switch controller 312 keeps on detecting the rotation speed of the spindle motor 302 until the rotation speed falls into the delta $V_S$ under CAV control mode.

Alternatively, the present feedback signal from FG 314 indicates that the switch controller 312 detects whether the spindle motor 302 rotates at a predetermined rotation speed according to the output pulses generated from FG 314 while switching the control mode from the CAV control mode to the open loop mode. Similar to the above, if not, the switch controller 312 maintains to detect the rotation speed of the spindle motor 302 until the rotation speed in CAV control mode is approximately equal to the predetermined rotation speed.

Further, during the open loop mode, the decoder 316 decodes the information, which is read from or recorded on the optical storage medium via OPU 304. Preferably, while switching the control mode of the spindle motor 302 between the open loop mode and CLV control mode in the target position B, the target indicative signal indicates that the switch controller 312 detects whether the decoder 316 correctly decodes the information. Since the information is accurately decoded, the switch controller 312 can directly switch the control mode from the open loop mode to the CLV control mode without interference.

Figure 4B:
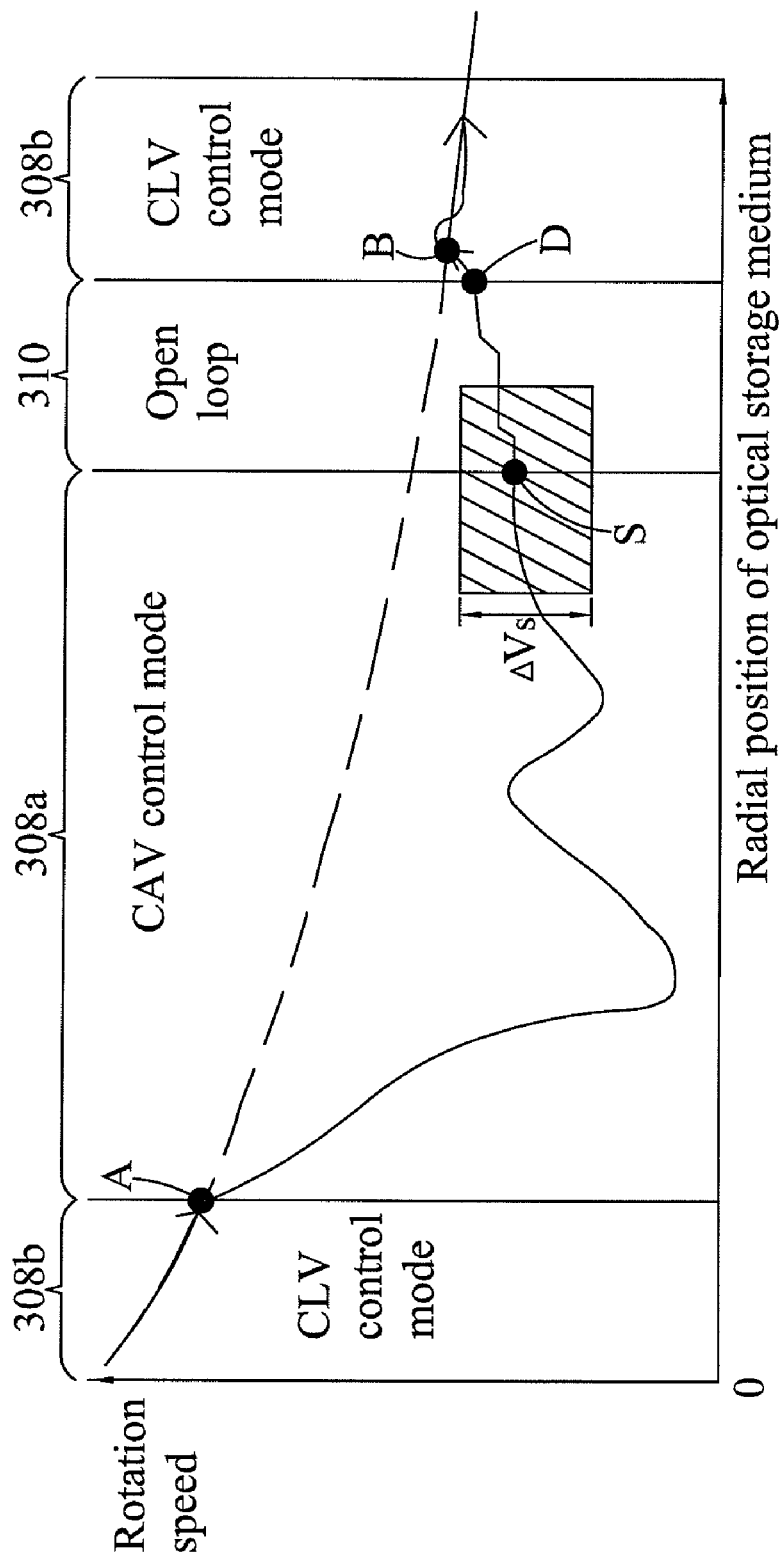
FIG. 4B is a graph of the relationship between rotation speed and radial position of the optical storage medium in FIG. 3 according to second preferred embodiment of the present invention.

In one preferred embodiment, during the open loop mode, the rotation speed of the spindle motor 302 is operated in a constant control voltage which is corresponding to the constant or predetermined control voltage, as mentioned above. In other words, the present feedback signal indicates that the switch controller 312 controls the spindle motor 302 to be operated in the constant control voltage during the open loop mode until the decoder 316 correctly decodes the information. Alternatively, the switch controller 312 adjusts the control voltage of the spindle motor 302 during the open loop mode by referring to the relationship between the radial position and the control voltage in the LUT 318 until the information is correctly decoded, as shown in FIG. 4B. FIG. 4B is a graph of the relationship between rotation speed and radial position of the optical storage medium according to second preferred embodiment of the present invention. Basically, FIG. 4B is similar to FIG. 4A except that the control voltage adjustment of the open control mode is different when the control voltage changes from positions S to D during the approaching procedure to the target position B. That is, in comparison to FIG. 4A, the control voltage is gradually changed between positions S and D in FIG. 4B.

As a result, the switch system of the present invention switches the control modes by analyzing whether the rotation speed of spindle motor 302 is detected stable when the control mode is switched from a present mode to a transition mode and the information on the optical storage medium are correctly decoded when the control mode is switched from the transition mode, i.e. open loop mode, to a target mode, such as CLV control mode.

Figure 4C:
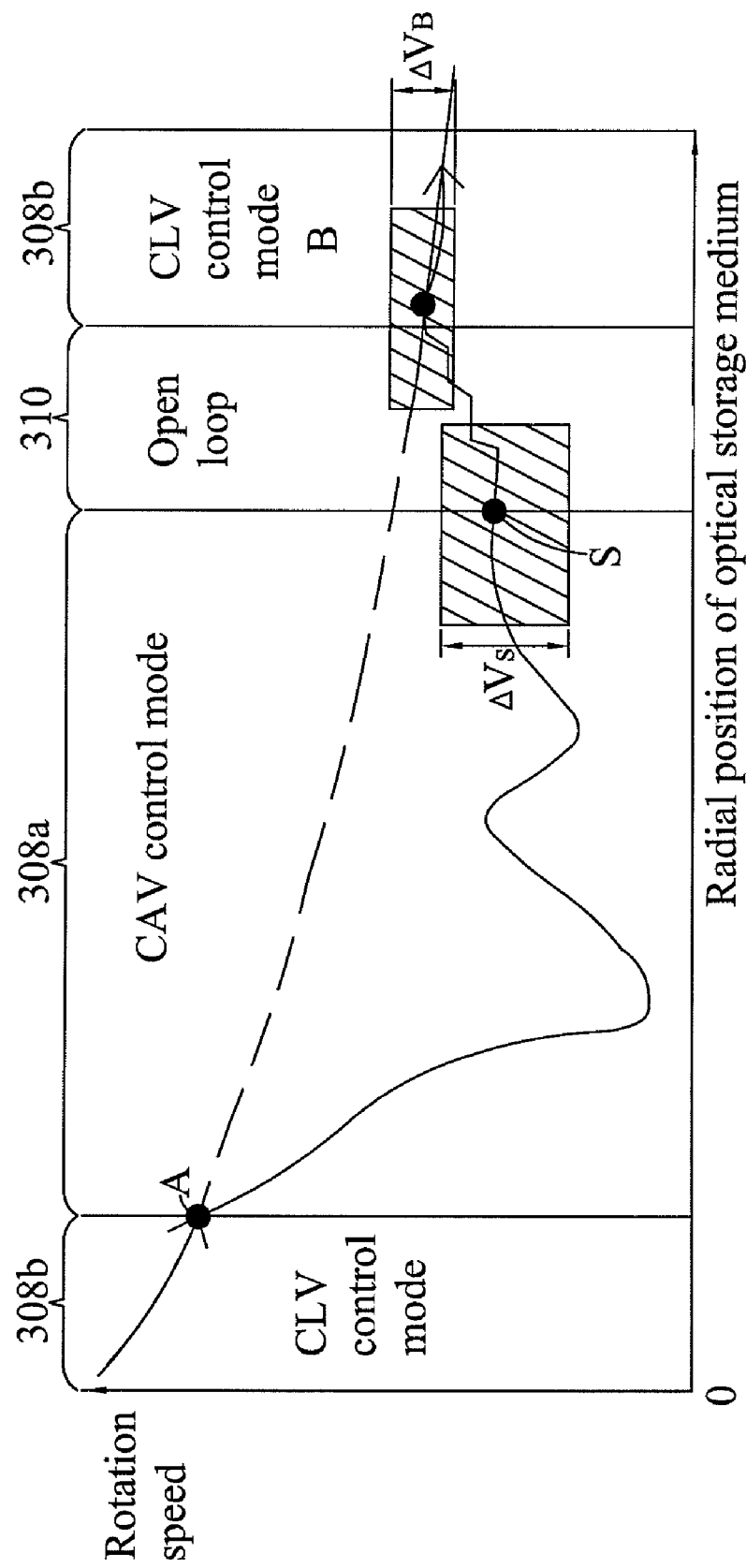
FIG. 4C is a graph of the relationship between rotation speed and radial position of the optical storage medium in FIG. 3 according to third preferred embodiment of the present invention.

Please refer to FIGS. 3 and 4C. FIG. 4C is a graph of the relationship between rotation speed and radial position of the optical storage medium according to third preferred embodiment of the present invention. Similar to FIG. 4A, the control modes in FIG. 4C comprises CAV control mode, open loop mode and CLV control mode. First, the control mode is switched from CLV control mode to CAV control mode. During the CAV control mode, the present feedback signal indicates that the switch controller 312 detects whether the spindle motor 302 is rotated stably at a constant rotation speed or a predetermined rotation speed threshold interval according to the output pulses from FG 314 while switching the control mode from the CAV control mode to the open loop mode. When the rotation speed falls into the delta $V_S$, the control mode is switched from CAV control mode at position S to open loop mode at position B, where delta $V_S$ is predetermined rotation speed threshold interval at the intermediate position S. Conversely, when the rotation speed is out of the delta $V_S$, the switch controller 312 keeps on detecting the rotation speed of the spindle motor 302 until the rotation speed in CAV control mode is constant. Afterwards, when the rotation speed falls into the delta $V_B$, the control mode is switched from open control mode at position S to CLV control mode at position B once again, where delta $V_B$ is predetermined rotation speed threshold interval at the target position B. If not, the switch controller 312 keeps on detecting the rotation speed of the spindle motor 302 until the rotation speed in CAV control mode falls into a constant or predetermined rotation speed threshold, i.e. delta $V_B$.

Alternatively, the present feedback signal indicates that the switch controller 312 detects whether the spindle motor 302 is rotated at a predetermined rotation speed according to the output pulses while switching the control mode from the CAV control mode to the open loop mode. Similarly, if not, the switch controller 312 continually detects the rotation speed until the rotation speed in CAV control mode is approximately equal to the predetermined rotation speed. The present feedback signal indicates that the switch controller 312 adjusts the control voltage of the spindle motor 302 during the open loop mode by referring to the relationship between the radial position and the control voltage in the LUT 318. The target indicative signal indicates that the switch controller 312 determines whether the spindle motor 302 is rotated stably at the rotation speed of the CLV control mode by referring to the relationship between the radial position and the rotation speed in the LUT 318 while switching the control mode from the open loop mode to the CLV control mode.

Therefore, the switch system 300 is able to switch the control modes to dynamically adjust the control voltage of spindle motor 302 during the transition mode to avoid control voltage jumps at the mode-switch point so that the switch controller 312 smoothly switches the transition mode to the target mode. Additionally, in FIGS. 4A-4B, the control criteria, i.e. delta $V_S$, for entering the open loop mode from CAV control mode can be larger than that in the prior art by ensuring that the information on the optical storage medium. Therefore, the switch controller 312 can easily and rapidly change the control mode by tolerable and preferred control criteria with respect to the rotation speed.

Figure 5:
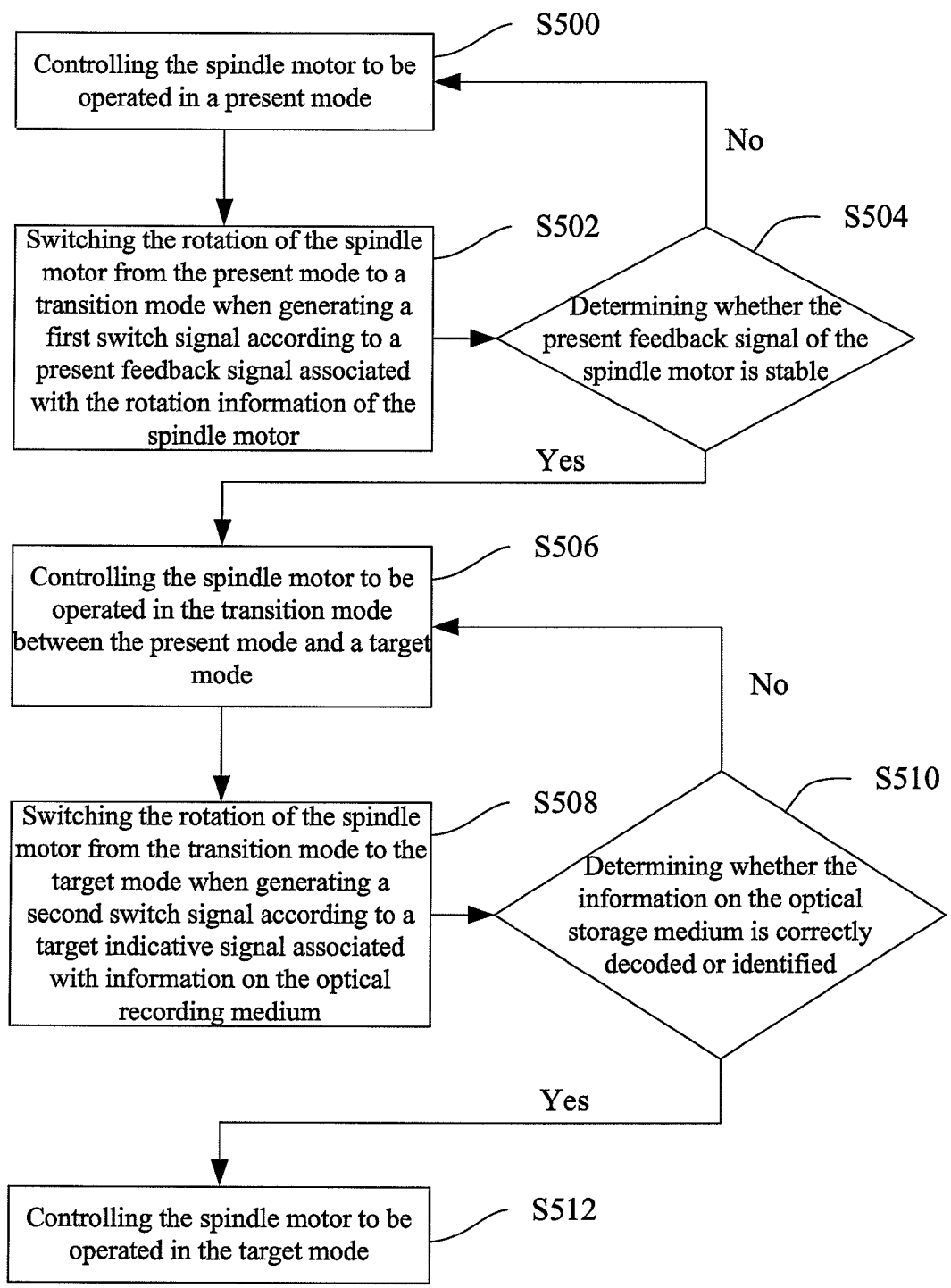
FIG. 5 is a flow chart of performing a switch method of control modes of a spindle motor according to one preferred embodiment of the present invention.

Please refer to FIGS. 4A-4C and FIG. 5. FIG. 5 is a flow chart of controlling data recording or reproducing on an optical storage medium according to one preferred embodiment of the present invention. The controlling method is described in detail as the following steps. In step S500, the spindle motor is controlled to be operated in a present mode while recording the information on or reading the information from a first radial position. Namely, the spindle motor operates in the present mode when the OPU records or reads the information on/from the first radial position of the optical storage medium. Then, in step S502, the rotation mode of the spindle motor is switched from the present mode to a transition mode when generating a first switch signal according to a present feedback signal associated with the rotation information of the spindle motor. In one embodiment, output pulses of the spindle motor are generated to detect whether the spindle motor is rotated stably at a constant rotation speed according to the output pulses while switching the control mode from the present mode to the transition mode. Afterwards, in step S504, the switch controller determines whether the rotation speed of the spindle motor is stable. If yes, go to next step S506—otherwise return to step S500. In step S506, the spindle motor is controlled to be operated in the transition mode between the present mode and the target mode while the rotation speed of the spindle motor is stable. That is, while recording the information on a second radial position of the optical storage medium, the OPU operates in the transition mode corresponding to the second radial position. In one embodiment, a look-up table (LUT) is generated to represent the relationship between the radial position of the optical storage medium and the rotation speed of the spindle motor. A control voltage of the spindle motor is represented as a function of the rotation speed to adjust the control voltage of the spindle motor during the transition mode by referring to the relationship between the radial position and the control voltage in the LUT until the information is correctly decoded. Then switch controller determines whether the spindle motor is rotated stably and accurately enough to the rotation speed of the target mode by referring to the relationship between the and the rotation speed in the LUT while switching the control mode from the transition mode to the target mode. In step S508, the rotation mode of the spindle motor is switched from the transition mode to the target mode when generating a second switch signal according to a target indicative signal associated with information on the optical storage medium. In one embodiment, the switch controller determines whether the data in the information is correctly decoded or the information on the optical storage medium is identified while switching the control mode from the transition mode to the target mode. Then, in step S510, the switch controller determines whether the information on the optical storage medium is correctly decoded. If yes, go to next step S512—otherwise return to step S506. Finally, in step S512, the spindle motor is controlled to be operated in a target mode while the decoded information on or read the information from a first radial position of the optical storage medium is correct.

The advantages of the present invention mainly include, but not limit to: (a) analyzing whether the rotation speed of spindle motor is detected stable when the control mode is to be changed from a present mode to a transition mode and the information on the optical storage medium are correctly decoded when the control mode is to be changed from the transition mode to a target mode; (b) adjusting the control voltage of spindle motor dynamically during the transition mode to avoid control voltage jumps at the mode-switch point; and (c) changing the control mode of the spindle motor easily and rapidly by employing a preferred control criterion.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A switch system of a plurality of control modes of a spindle motor when an optical pick-up (OPU) records or reproduces information on an optical storage medium, the switch system comprising:
    a first control module electrically coupled to the spindle motor and the optical pick-up (OPU), controlling the spindle motor to be operated in a present mode;
    a second control module electrically coupled to the spindle motor, controlling the spindle motor to be operated in a transition mode between the present mode and a target mode; and
    a switch controller electrically coupled to the first control module, the second control module and the spindle motor, receiving a present feedback signal associated with a rotation speed of spindle motor to generate a first switch signal, and receiving a target indicative signal associated with the information on the optical storage medium to generate a second switch signal, wherein the switch controller switches the control mode of the spindle motor from the present mode to the transition mode in response to the first switch signal based on the rotation speed, and the switch controller switches the control mode of the spindle motor from the transition mode to the target mode in response to the second switch signal based on the target indicative signal.

2. The switch system of claim 1, further comprising a frequency generator (FG) electrically coupled to the spindle motor, the first control module and the switch controller to generate output pulses of the spindle motor.

3. The switch system of claim 2, wherein the present feedback signal indicates that the switch controller detects whether the spindle motor is rotated stably at a constant rotation speed according to the output pulses while switching the control mode of the spindle motor from the present mode to the transition mode.

4. The switch system of claim 2, wherein the present feedback signal indicates that the switch controller detects whether the spindle motor is rotated stably at a predetermined rotation speed according to the output pulses while switching the control mode of the spindle motor from the present mode to the transition mode.

5. The switch system of claim 1, further comprising a decoder electrically coupled to the optical pick-up (OPU), the first control module and the switch controller to decode the information on the optical storage medium.

6. The switch system of claim 5, wherein the target indicative signal indicates that the switch controller detects whether the decoder correctly decodes the information while switching the control mode of the spindle motor from the transition mode to the target mode.

7. The switch system of claim 5, wherein the present feedback signal indicates that the switch controller controls the spindle motor to be operated in a constant control voltage during the transition mode until the decoder correctly decodes the information.

8. The switch system of claim 1, further comprising a look-up table (LUT) representing the relationship between a radial position of the optical storage medium and the rotation speed of the spindle motor, wherein a control voltage of the spindle motor is represented as a function of the rotation speed.

9. The switch system of claim 8, wherein the present feedback signal indicates that the switch controller adjusts the control voltage of the spindle motor during the transition mode by referring to the relationship between the radial position and the control voltage in the look-up table (LUT) until the information is correctly decoded.

10. The switch system of claim 8, wherein the target indicative signal indicates that the switch controller determines whether the spindle motor is rotated stably at the rotation speed of the target mode by referring to the relationship between the radial position and the rotation speed in the look-up table (LUT) while switching the control mode of the spindle motor from the transition mode to the target mode.

11. The switch system of claim 1, further comprising a phase-locked loop (PLL) circuit electrically coupled to the optical pick-up (OPU), the first control module and the switch controller for identifying the information.

12. The switch system of claim 11, wherein the target indicative signal indicates that the switch controller determines whether the phase-locked loop (PLL) circuit stably identifies the information while switching the control mode of the spindle motor from the transition mode to the target mode.

13. The switch system of claim 11, wherein the target indicative signal indicates that the switch controller determines whether the phase-locked loop (PLL) circuit stably identifies the information associated with a wobble signal while switching the control mode of the spindle motor from the transition mode to the target mode.

14. The switch system of claim 1, wherein the transition mode controlled by the first control module is an open loop control.

15. The switch system of claim 1, wherein the present mode controlled by the second control module is a constant angular velocity (CAV) mode in a closed loop control.

16. The switch system of claim 15, wherein the target mode controlled by the second control module is a constant linear velocity (CLV) mode in a closed loop control.

17. The switch system of claim 16, wherein the transition mode represents an intermediate mode between the present mode and the target mode under the closed loop control modes.

18. A switch method of a plurality of control modes of a spindle motor when an optical pick-up (OPU) records or reproduces information on an optical storage medium, the switch method comprising the steps of:
controlling the spindle motor to be operated in a present mode while recording the information on a first radial position of the optical storage medium;
switching the rotation of the spindle motor from the present mode to a transition mode when generating a first switch signal according to a present feedback signal associated with the rotation information of the spindle motor;
controlling the spindle motor to be operated in the transition mode between the present mode and a target mode while recording the information on a second radial position of the optical storage medium; and
switching the rotation of the spindle motor from the transition mode to the target mode when generating a second switch signal according to a target indicative signal associated with information on the optical storage medium.

19. The switch method of claim 18, further comprising generating output pulses of the spindle motor.

20. The switch method of claim 19, wherein the present feedback signal indicates whether the spindle motor is rotated stably at a constant rotation speed according to the output pulses while switching the control mode of the spindle motor from the present mode to the transition mode.

21. The switch method of claim 19, wherein the present feedback signal indicates whether the spindle motor is rotated stably at a predetermined rotation speed according to the output pulses while switching the control mode of the spindle motor from the present mode to the transition mode.

22. The switch method of claim 18, during the step of switching the rotation of the spindle motor, further comprising decoding the information on the optical storage medium.

23. The switch method of claim 22, wherein the target indicative signal indicates whether the information is correctly decoded while switching the control mode of the spindle motor from the transition mode to the target mode.

24. The switch method of claim 22, wherein the present feedback signal indicates that the spindle motor is operated in a constant control voltage during the transition mode until the information is correctly decoded.

25. The switch method of claim 18, further comprising generating a look-up table (LUT) representing the relationship between a radial position of the optical storage medium and the rotation speed of the spindle motor, wherein a control voltage of the spindle motor is represented as a function of the rotation speed.

26. The switch method of claim 25, further comprising adjusting the control voltage of the spindle motor during the transition mode by referring to the relationship between the radial position and the control voltage in the look-up table (LUT) until the information is correctly decoded.

27. The switch method of claim 25, further comprising determining whether the spindle motor is rotated stably at the rotation speed of the target mode by referring to the relationship between the radial position and the rotation speed in the look-up table (LUT) while switching the control mode of the spindle motor from the transition mode to the target mode.

28. The switch method of claim 18, during the step of switching the rotation of the spindle motor from the transition mode to the target mode, further comprising identifying the information on the optical storage medium.

29. The switch method of claim 28, wherein the target indicative signal indicates whether the information is stably identified while switching the control mode of the spindle motor from the transition mode to the target mode.

30. The switch method of claim 28, wherein the target indicative signal indicates whether the information associated with a wobble signal is stably identified while switching the control mode of the spindle motor from the transition mode to the target mode.

31. The switch method of claim 18, wherein the transition mode is an open loop control.

32. The switch method of claim 18, wherein the present mode is a constant angular velocity (CAV) in a closed loop control.

33. The switch method of claim 32, wherein the target mode is a constant linear velocity (CLV) in a closed loop control.

34. The switch method of claim 33, wherein the transition mode represents the intermediate mode between the present mode and the target mode under the closed loop control modes.

35. A switch system of a plurality of control modes of a spindle motor when an optical pick-up (OPU) records or reproduces information on an optical storage medium, the switch system comprising:
a first control module, controlling the spindle motor to be operated in a present mode;
a second control module, controlling the spindle motor to be operated in a transition mode between the present mode and a target mode; and
a switch controller, receiving a present feedback signal associated with a rotation speed of the spindle motor to generate a first switch signal, and receiving a target indicative signal associated with the information to generate a second switch signal, wherein the switch controller switches the control mode of the spindle motor from the present mode to the transition mode in response to the first switch signal based on the rotation speed, and the switch controller switches the control mode of the spindle motor from the transition mode to the target mode in response to the second switch signal based on the target indicative signal.

36. A switch method of a plurality of control modes of a spindle motor when an optical pick-up (OPU) records or reproduces information on an optical storage medium, the switch method comprising the steps of:
controlling the spindle motor to be operated in a present mode while recording or reproducing the information;
switching the rotation of the spindle motor from the present mode to a transition mode when generating a first switch signal according to a present feedback signal associated with the rotation information of the spindle motor;
controlling the spindle motor to be operated in the transition mode between the present mode and a target mode while recording or reproducing the information; and
switching the rotation of the spindle motor from the transition mode to the target mode when generating a second switch signal according to a target indicative signal associated with information on the optical storage medium.

* * * * *